United States Patent
Kharkar et al.

(10) Patent No.: US 10,413,829 B2
(45) Date of Patent: Sep. 17, 2019

(54) SYSTEM AND METHOD OF IMPLEMENTING BEHAVIOR TREES WHEN MODIFYING ATTRIBUTE VALUES OF GAME ENTITIES BASED ON PHYSICAL TOKEN DETECTION

(71) Applicant: DISNEY ENTERPRISES, INC., Burbank, CA (US)

(72) Inventors: Sandeep Kharkar, Burbank, CA (US); Derek Peterson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 423 days.

(21) Appl. No.: 15/019,383

(22) Filed: Feb. 9, 2016

(65) Prior Publication Data
US 2017/0225076 A1    Aug. 10, 2017

(51) Int. Cl.
- *A63F 13/69* (2014.01)
- *A63F 13/58* (2014.01)
- *A63F 13/56* (2014.01)
- *A63F 13/95* (2014.01)

(52) U.S. Cl.
CPC ............ *A63F 13/58* (2014.09); *A63F 13/56* (2014.09); *A63F 13/69* (2014.09); *A63F 13/95* (2014.09); *A63F 2300/6607* (2013.01)

(58) Field of Classification Search
CPC .. A63F 13/58; A63F 13/23; A63F 2300/6607; G06T 13/40
See application file for complete search history.

(56) References Cited

U.S. PATENT DOCUMENTS

| | | | | |
|---|---|---|---|---|
| 5,767,861 | A | * | 6/1998 | Kimura .................. G06T 13/40 345/427 |
| 6,352,478 | B1 | * | 3/2002 | Gabai ..................... A63F 13/12 463/42 |
| 7,081,033 | B1 | * | 7/2006 | Mawle .................... A63F 13/02 446/175 |
| 9,039,532 | B2 | * | 5/2015 | Canessa ................. A63F 13/02 463/39 |
| 2004/0005921 | A1 | * | 1/2004 | Shinoda .................. G07F 1/06 463/29 |
| 2012/0238362 | A1 | | 9/2012 | Janis |
| 2016/0067599 | A1 | | 3/2016 | Janis |
| 2016/0067611 | A1 | | 3/2016 | Ware |
| 2016/0184634 | A1 | | 6/2016 | Yanev |

* cited by examiner

*Primary Examiner* — Jay Trent Liddle
(74) *Attorney, Agent, or Firm* — Esplin & Associates, PC (57) ABSTRACT

Systems and methods configured for implementing behavior trees when modifying attribute values of game entities based on physical token detection are presented herein. Behavior and/or action of game entities may be implemented using behavior trees. Individual behavior trees may be implemented for individual game entities and/or groups of game entities defined, at least in part, by individual sets of attribute values. Token detection may cause attribute values of one or more game entity attributes to change. In response to the change in attribute values, a behavior tree being implemented for the game entity may be changed to a different game entity. In this manner, behavioral changes for game entity may be implemented "on-the-fly" as attribute values are modified based on token detection.

22 Claims, 4 Drawing Sheets

SYSTEM AND METHOD OF IMPLEMENTING BEHAVIOR TREES WHEN MODIFYING ATTRIBUTE VALUES OF GAME ENTITIES BASED ON PHYSICAL TOKEN DETECTION

FIELD OF THE DISCLOSURE

This disclosure relates to implementing behavior trees when modified attribute values of game entity based on physical token detection.

BACKGROUND

Physical token detection by a token reader may allow game entities to be presented within instances virtual space. Individual tokens may embody the physical appearance of individual game entities. Other tokens may embody other form factors. By way of non-limiting example, tokens may embody the physical appearance of virtual items and/or other objects. Detection of tokens may facilitate effectuating presentation of instances of game entities and/or virtual items within the virtual space.

SUMMARY

One aspect of the disclosure relates to a system configured for implementing behavior trees when modifying attribute values of game entities based on physical token detection. Behavior and/or action of game entities may be implemented using behavior trees. Individual behavior trees may be implemented for individual game entities and/or groups of game entities defined, at least in part, by individual sets of attribute values. Token detection may cause attribute values of one or more game entity attributes to change. In response to the change in attribute values, a behavior tree being implemented for the game entity may be changed to a different game entity. In this manner, behavioral changes for game entity may be implemented "on-the-fly" as attribute values are modified based on token detection.

Behavior trees may include nodes that correspond to different states of the game entities. Behavior trees may include edges that correspond to transitions between nodes. An individual behavior tree may be used for an individual game entity. A complex action for a game entity may be implemented by a sequence of nodes within a behavior tree. A sequence may include one or more transitions between different nodes. For example, when a game entity performs a jump, such an action may be implemented by a sequence of nodes going from lift-off, via hang-time, to landing. For complex game entities, multiple components may act (at least somewhat) independently. For example, the legs, torso, arms, and head of a game entity may have a range of possible motions/actions during a particular action such as a jump. Arms could flail, hold, drop, or use a weapon, reload, cast a spell, and/or perform other actions. The head could tilt in different directions, have different expressions, and/or perform other actions. The landing may be standing up straight, crouching, rolling, and/or other actions. In some embodiments, a game entity may have multiple concurrently active nodes within a behavior tree such that individual nodes correspond to different components within the game entity. Within a sequence of nodes, some nodes may be more significant than other nodes. For example, the first node of a particular action, such as a jump, may contain all or much of the information needed to determine important aspects of the action, such as the expected location of a game entity after the jump is completed. As a result, intermediate nodes between the first node and the last node of a particular action may be less significant than the first node.

In some implementations, the system may include one or more physical processors configured by machine-readable instructions. Executing the machine-readable instructions may cause the one or more physical processors to facilitate implementing behavior trees when modifying attribute values of game entities based on physical token detection. The machine-readable instructions may include one or more of a space component, a token detection component, a modification component, a behavior component, and/or other components.

The space component may be configured to execute instances of a virtual space and implement the instances of the virtual space to facilitate participation by users in the virtual space via computing platforms associated with the users. User participation may include controlling game entities associated with the users within the virtual space. By way of non-limiting example, a first user may participate in a first instance of the virtual space via a first computing platform. Participation by the first user may include controlling a first game entity within the first instance of the virtual space. The first game entity may be defined at least in part by a first set of attribute values.

The behavior component may be configured to store behavior trees for game entities. Individual game entities may be defined by sets of attribute values of game entity attributes. Individual behavior trees may specify behaviors of individual game entities within the virtual space for carrying out actions within the virtual space. The behavior trees may include one or more of a first behavior tree that is implemented for game entities defined by a first set of attribute values, a second behavior tree that is implemented for game entities defined by a second set of attribute values, and/or other behavior trees. As such, a behavior of the first game entity may be specified based on implementation of the first behavior tree and/or other behavior trees.

The token detection component may be configured to detect tokens based on signals received from token readers. A first token reader may be communicatively coupled with the first computing platform. Individual tokens may be standalone physical objects. The tokens may include one or more of a first token, a second token, and/or other tokens. The first token being detectable based on a first signal conveying information associated with the first token being received from the first token reader and/or other token readers.

The modification component may be configured to effectuate modifications to attribute values of individual game entities responsive to individual tokens being detected. The modifications may include a first modification and/or other modifications. The first modification may be a modification to attribute values of the first game entity that is configured to be effectuated responsive to the first token being detected. The first modification including a change from the first set of attribute values to the second set of attributes values.

The behavior component may be configured to effectuate changes from individual behavior trees that are implemented for individual game entities to other individual behavior trees responsive to the modifications to attribute values of the individual game entities being effectuated. By way of non-limiting example, the behavior of the first game entity may be specified based on implementation of the second behavior tree and not the first behavior tree responsive to effectuating the first modification.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
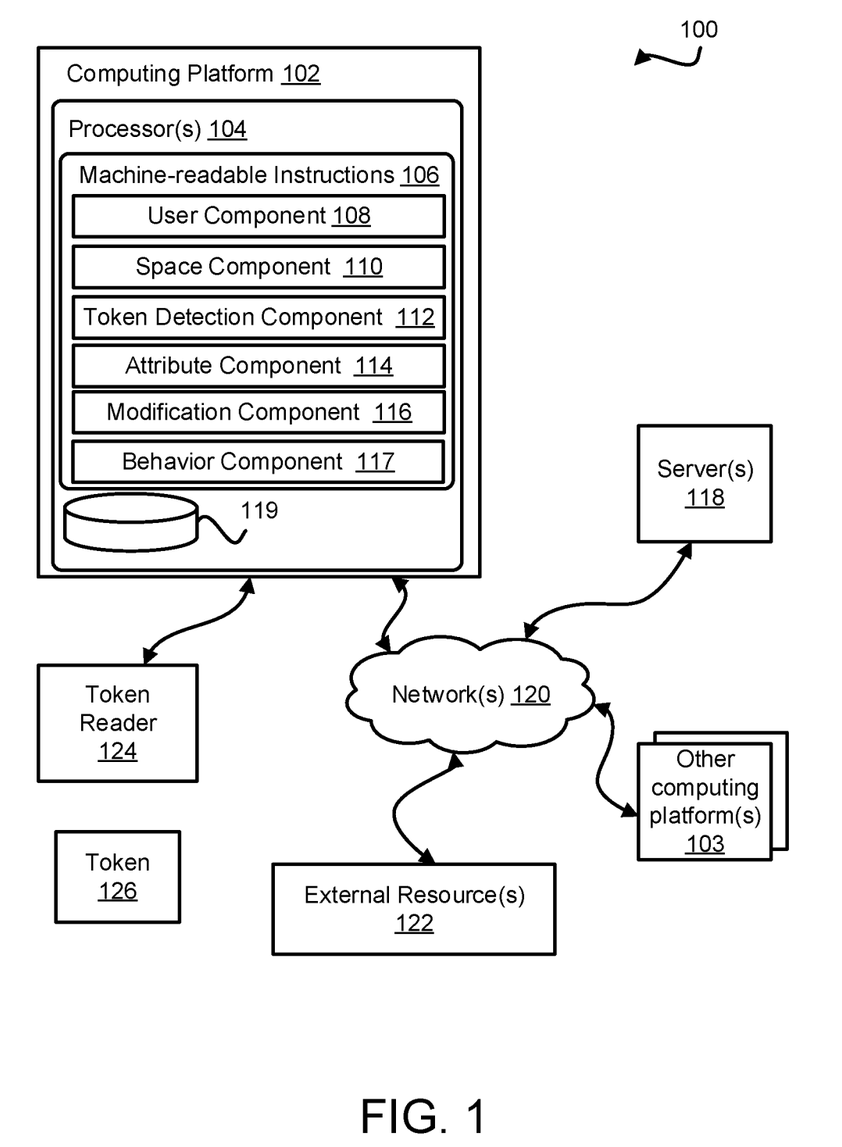
FIG. 1 illustrates a system configured for implementing behavior trees when modifying attribute values of game entities based on physical token detection, in accordance with one or more implementations.

FIG. 1 illustrates a system 100 configured for implementing behavior trees when modifying attribute values of game entities based on physical token detection. A given token may be a standalone physical object. In some implementations, the given token may be configured to depict a game entity, a virtual item, and/or other form factors. Examples of form factors may include one or more of a toy figurine, a toy accessory, a coin, and/or other form factors suitable to be tokens as described herein.

By way of non-limiting example, a token may be a toy figurine embodying an appearance of one or more of a game entity, virtual item, and/or other form factors. By way of non-limiting illustration, a given game entity may be Captain Jack Sparrow, the fictional character and protagonist of the Pirates of the Caribbean film series. A given virtual item may be an accessory associated with Captain Jack Sparrow, such as a sword. The given token may be a toy figurine embodying the appearance of Captain Jack Sparrow and/or the sword.

The system 100 may include one or more of one or more computing platforms (e.g., 102 and/or 103), one or more servers 118, and/or other components. It is noted herein that one or more references made solely to computing platform 102 are provided for illustrative purpose and is not to be considered limiting. For example, in some implementations, one or more features and/or functions attribute to computing platform 102 may be similarly attributed to one or more other computing platforms 103.

In some implementations, computing platform 102 may be configured to communicate with one or more servers (e.g., server(s) 118) according to a client/server architecture and/or other communication scheme. In some implementations, computing platform 102 may communicate with one or more other computing platforms 103 according to a peer-to-peer architecture, via communications routed through server(s) 118, and/or other communication schemes. The users may access system 100 and/or the virtual space via the computing platform(s) 102. The computing platform(s) 102 may include one or more of a cellular telephone, a smartphone, a laptop, a tablet computer, a desktop computer, a television set-top box, a client device, a smart TV, a gaming console, and/or other device suitable for the intended purposes as described herein.

The computing platform 102 may include one or more physical processors 104 configured by machine-readable instructions 106, electronic storage 119, and/or other components. Executing the machine-readable instructions 106 may cause one or more physical processors 104 to facilitate implementing behavior trees when modifying attribute values of game entities based on physical token detection. Computing platform 102 may be configured to execute an instance of the virtual space and/or a video game taking place in the virtual space by using information stored by and/or local to computing platform 102 (e.g., a game cartridge, game disk, memory card/stick, USB memory stick, electronic storage, and/or other considerations), information obtained from one or more servers 118, and/or other information. The machine-readable instructions 106 may include one or more of a user component 108, a space component 110, a token detection component 112, an attribute component 114, a modification component 116, a behavior component 117, and/or other components.

It is noted that in some implementations, providing the virtual space may include hosting the virtual space via one or more servers 118 over network 120. By way of non-limiting example, one or more servers 118 may include machine-readable instructions that may include one or more of the same or similar components of machine-readable instructions 106 of computing platform 102. In some implementations, hosting the virtual space via server(s) 118 may comprise an "online" version of the virtual space, while hosting the virtual space by executing one or more components of machine-readable instructions 106 may comprise an "offline" version of the virtual space.

The user component 108 may be configured to access and/or manage one or more user identifications, user profiles, and/or user information associated with users of system 100. The one or more one or more user identifications, user profiles, and/or user information may include information stored by computing platform 102, server(s) 118, and/or other storage locations. The one or more user identifications, user profiles, and/or user information may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a computing platform identification associated with a user, a phone number associated with a user, gameplay information (e.g., attribute values of game entity attribute of one or more game entities associated with the user, and/or other information) and/or other information related to users.

The space component 110 may be configured to implement one or more instances of the virtual space executed by machine-readable instructions 106 to determine views of the virtual space. In some implementations where the virtual space may be hosted by server(s) 118, the views may then be communicated (e.g., via streaming, via object/position data, and/or other information) from server(s) 118 to computing platform 102 for presentation to users. The view determined and presented to a given user may correspond to a game entity being controlled by the given user. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by one or more users via computing platform 102 that present the views of the virtual space to the one or more users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by machine-readable instructions 106 may be synchronous, asynchronous, and/or semi-synchronous.

The above description of the manner in which views of the virtual space are determined by space component 110 is not intended to be limiting. The space component 110 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 110, users may control game entities, objects, simulated physical phenomena (e.g., wind, rain, earthquakes, and/or other phenomena), and/or other elements within the virtual space to interact with the virtual space and/or each other. One or more user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual items and/or currency that the user can use (e.g., by manipulation of a game entity or other user controlled element, and/or other items) within the virtual space.

Virtual items may include one or more of a virtual weapon, a tool, a food, a currency, a reward, a bonus, health, a portion, an enhancement, a mount, a power-up, a speed-up, clothing, a vehicle, an anatomical feature of a game entity, a troop or troop type, a pet, a virtual resource, and/or other virtual items and/or goods.

The users may participate in the instance of the virtual space by controlling one or more of the available user controlled elements in the virtual space. Control may be exercised through control inputs and/or commands input by the users through computing platform(s) 102. The users may interact with each other through communications exchanged within the virtual space. Such communications may include one or more of textual chat, instant messages, private messages, voice communications, and/or other communications. Communications may be received and entered by the users via their respective computing platform(s) 102. Communications may be routed to and from the appropriate users through server(s) 118.

User participation in the virtual space may include controlling game entities in the virtual space. A game entity may refer to a virtual object (or group of objects) present in the virtual space that represents an individual user. For example, a game entity may be a virtual character (e.g., an avatar) and/or other virtual objects. A group of game entities may include a group of virtual characters, virtual objects, and/or other content.

In some implementations, space component 110 may be configured to effectuate presentation of one or more game entities within an instance of the virtual space responsive to one or more token associated with individual ones of the one or more game entities being detected by a token reader 124 (see, e.g., token detection component 112). By way of non-limiting example, detection of an individual token embodying a physical appearance of a game entity by a token reader (e.g., token reader 124) coupled to a computing platform (e.g., an individual one of computing platform(s) 102) may facilitate effectuating presentation of the individual game entity within an instance of the virtual space. The game entity may be made available for control by the user within the virtual space. In some implementations, the game entity may be presented within the instance of the virtual space for so long as the token continues to be detected by token reader 124. For example, once the token is removed from the token reader and/or otherwise made undetectable by the token reader, the game entity may be "removed" from the virtual space and/or otherwise may no longer be available to the user within the instance of the virtual space. However, in some implementations, continued detection of the token by a token reader may not be required for the game entity to remain available within the instance of the virtual space. For example, the token may have to be detected at least once in order for the corresponding game entity to be made available within the instance of the virtual space.

In some implementations, individual game entities may be defined by attribute values of one or more game entity attributes, and/or other information. In some implementations, attribute values of one or more game entity attributes may comprise one or both of default attribute values, values defined based on gameplay, and/or other attribute values.

In some implementations, default attribute values may correspond to a set of attribute values associated with an initial instantiation of a game entity within an instance of the virtual space. Initial instantiation may refer to a first use of a game entity by a user within an instance of the virtual space absent prior gameplay using the game entity. In some implementations, one or more game entities of an individual game entity type may be associated with a same or similar set of default attribute values. By way of non-limiting example, different instances of an individual game entity may be associated with different users. The different instances may be associated with the same set of default attribute values.

In some implementations, attribute values of one or more game entity attributes may be set and/or otherwise defined based on user gameplay in the virtual space. For example, a user may interact with the virtual space through gameplay in a manner which may modify individual attribute values of one or more game entity attributes. A user's progress in the game may allow them to "up-grade" one or more attribute values of one or more game entities they control in the virtual space. By way of non-limiting example, a user may progress through gameplay in the virtual space such that their game entity may become faster, stronger, stealthier, heal faster, and/or may be up-graded in other ways. This may be referred to as "leveling up" a game entity. By way of non-limiting illustration, a user's progress in the virtual space using a first game entity may cause a first attribute value of a first game entity attribute to change to a second attribute value and/or other values.

In some implementations, a game entity attribute may include one or more of an appearance attribute, an ability attribute, a behavior attribute, an inventory attribute, and/or other attributes.

An appearance attribute may include one or more of a color attribute, a surface texture attribute, a special visual effect attribute, virtual clothing attribute, anatomic feature attribute, and/or other attributes.

Values of a color attribute may specify a color of one or more surfaces of a game entity within the virtual space. Surfaces may include one or more of simulated skin, hair, appendages, and/or other surface. By way of non-limiting example, an attribute value of a color attribute may specify one or more of red, blue, green, black, brown, tan, beige, and/or other colors. An attribute value of a color attribute may further specify transparency values of one or more colors, and/or other information.

Values of a surface texture attribute may specify surface texture features of one or more surfaces of a game entity within a virtual space. By way of non-limiting example, an attribute value of a surface texture attribute may specify one or more of smooth, rough, hairy, scaly, shiny, transparent, cloth-like, metallic, and/or other surface texture features.

Values of a special visual effect attribute may specify one or more visual effects associated with a game entity within the virtual space. By way of non-limiting example, an attribute value of a special visual effect attribute may specify one or more of a glow, an aura, trails of light, presence or absence of shadows, footprints or lack thereof, oily, watery, gooey drips, cycling skin mutations, cycling transparency, and/or other visual effects.

Values of a virtual clothing attribute may specify one or more articles of virtual clothing a game entity may be depicted as wearing within the virtual space. By way of non-limiting example, an attribute value of a virtual clothing attribute may specify one or more of a hat, a shirt, a cape, shoes, pants, and/or other clothing a game entity may be depicted as wearing. In some implementations, attribute values of a virtual clothing attribute may specify appearance features of individual articles of virtual clothing. Appearance features may include one or more of color, design, shape, form, and/or other appearance features of individual articles of virtual clothing.

Values of an anatomic feature attribute may specify one or more features that make up the anatomy of a game entity. By way of non-limiting example, an attribute value of an anatomic feature attribute may specify one or more of a quantity of appendages, a size of the game entity, a size of individual appendages, and/or other anatomical features. By way of non-limiting illustration, an attribute value of a anatomic feature attribute may specify one or more of that a game entity may include additional appendages (temporarily or permanently), may increase (or decrease) in size, and/or other anatomic feature specifications.

Attribute values of an ability attribute may specify one or more abilities of a game entity within the virtual space. In some implementations, abilities may correspond to one or more actions performable by a game entity within the virtual space. An action may include one or more of walking, running, jumping, healing, fighting (e.g., punching, kicking, dodging, using special weapons, and/or other fighting actions), driving vehicles, riding, carrying heavy objects, climbing, flying, changing size or visibility, controlling the actions of other game entities, and/or other actions. In some implementations, an attribute value of an ability attribute may specify some measure of a game entity's ability to perform an action within the virtual space. By way of non-limiting example, an attribute value of an ability attribute may specify one or more of a power level of a particular action a game entity may be capable of performing in the virtual space.

Attribute values may be expressed one or more of numerically (e.g., level 1, level 2, and/or other numerical description), descriptively (e.g., strong, moderate, weak, red, green, ledge climb, special gun 1, and/or other descriptive representation), using reference to other game assets (e.g., AttributeList1, MickeyCostume, and/or other assets), and/or expressed in other ways.

By way of non-limiting example, an attribute value may specify one or more of a strength, power, speed, agility, and/or other measure of a game entity's ability to perform an action within the virtual space. By way of non-limiting example, a first attribute value of an ability attribute may specify that a game entity punches with "level 1" power, while a second attribute value of an ability attribute may specify that a game entity punches with a "level 4" power. By way of non-limiting example, a third attribute value of an ability attribute may specify that a game entity runs with "slow", while a fourth attribute value of an ability attribute may specify that a game entity runs "fast."

Attribute values of a behavior attribute may specify the way in which a game entity behaves within the virtual space. In some implementations, behavior may correspond to how a game entity visually performs actions within the virtual space. An action may include one or more of walking, running, jumping, fighting, healing, driving, carrying, flying, climbing, repairing, and/or other actions. By way of non-limiting example, a first attribute value of a behavior attribute may specify that a game entity walks with a short stride. By way of non-limiting example, a second attribute value of a behavior attribute may specify that a game entity walks with a long stride. Attribute values of a behavior attribute may be considered in other ways.

Attribute values of an inventory attribute may specify one or more virtual items that a game entity may use with the virtual space, one or more virtual items a game entity may be equipped with within the virtual space, and/or one or more virtual items that may otherwise be made available to the game entity within a virtual item inventory associated with the game entity. By way of non-limiting example, a first attribute value of an inventory attribute may specify that a game entity is equipped with a first virtual item within the virtual space, while a second attribute value of an inventory attribute may specify that a game entity is equipped with a second virtual item with the virtual space. The first virtual item may be a first weapon used for combat, such as a sword, while the second virtual item may be a second weapon used for combat, such as a gun. In some implementations, a third virtual item may be an article of clothing (e.g., a cloak) that grants the game entity the ability to be invisible.

It is noted that the above description of attribute values and/or game entity attribute are provided for illustrative purpose and is not intended to be considered limiting. For example in some implementations, game entity attributes may include one or more other attributes not listed and/or attribute values may be expressed in other ways.

In some implementations, space component 110 may be configured to effectuate presentation of a game entity within an instance of the virtual space responsive to a token associated with the game entity being detected by a token reader 124 (see, e.g., token detection component 112). By way of non-limiting example, detection of a token embodying a physical appearance of a game entity by a token reader (e.g., token reader 124) coupled to a computing platform (e.g., an individual one of computing platform(s) 102) may facilitate effectuating presentation of the game entity within an instance of the virtual space. The game entity may be made available for control by the user within the virtual space. In some implementations, the game entity may be presented within the instance of the virtual space for so long as the token continues to be detected by the token reader. For example, once the token is removed from the token reader and/or otherwise made undetectable by the token reader, the game entity may be "removed" from the virtual space and/or otherwise may no longer be available to the user within the instance of the virtual space. However, in some implementations, continued detection of the token by a token reader may not be required for the game entity to remain available within the instance of the virtual space. For example, the token may have to be detected at least once in order for the corresponding game entity to be made available within the instance of the virtual space.

The token detection component 112 may be configured to detect tokens based on signals received from a token reader 124. A given token (e.g., token 126) may be a standalone physical object. Individual tokens may be configured to be detectable by token reader 124. In some implementations, detection of a given token may be based on a shape of a portion of the given token, and/or other detection techniques. In some implementations, a given token may be detectable based on a given signal emitted from the given token conveying information associated with the given token, and/or other detection techniques.

In some implementations, detection of a given token may be facilitated by electronics embedded within or otherwise included in the given token. For example, the given token may include a radio-frequency identification (RFID) chip configured to emit and/or receive radio-frequency electromagnetic fields responsive to the given token being disposed in a proximity of token reader 124, and/or other components. As another example, the given token may include an integrated circuit configured to transfer information associated with the given token responsive to the given token being placed in contact with a portion of token reader 124. A given token may include electronic storage configured to store information associated with the given token.

The token reader 124 may be configured to provide signals associated with individual tokens. A given signal may convey information associated with the given token (information stored by the given token), and/or other information. In some implementations, token reader 124 may be configured to provide a first signal responsive to one or more of a first token abutting a portion of the token reader, the first token being disposed in a proximity of the token reader, and/or other actions configured to facilitate detection of the first token. According to some implementations, token reader 124 may be a peripheral device configured to be communicatively coupled with one or more components of system 100. In some implementations, token reader 124 may be integrated so as to form a singular device with a component of system 100 (e.g., a given virtual space platform 102). According to some implementations, one or more of the computing platform(s) 102 may be communicatively coupled with token reader 124, while one or more of the computing platform(s) 102 may not be communicatively coupled with and/or otherwise associated with a token reader. For example, a stationary computing platform may have an integrated token reader, while a mobile computing platform may not have a token reader associated therewith.

In some implementations, token reader 124 may be configured to communicate information to individual tokens via signals conveying the information (e.g., write information back to a given token). By way of non-limiting example, token reader 124 may be configured to obtain information from one or more of one or more computing platforms 102/103, server(s) 118, and/or from other information sources. Information obtained by token reader 124 may comprise gameplay information, and/or other information. Gameplay information may comprise information associated with gameplay in the virtual space. By way of non-limiting example, gameplay information may comprise attribute values of one or more game entity attributes determined at the end of a prior session within the virtual space. The gameplay information may be compiled into a signal that the token reader 124 may communicate back to a given token (e.g., a token embodying the physical appearance of a game entity with which the attribute values may be associated).

By way of non-limiting illustration, token 126 may be configured to store information associated with token 126, and/or other information. Token 126 may include electronic storage (not shown in FIG. 1) configured to store information, and/or other components. In some implementations, information stored by token 126 may include one or more of identifying information that may identify the token 126 (e.g., a name, a serial number, an identifier, and/or other identifying information), gameplay information (e.g., attribute values of one or more game entity attributes that were defined at the end of prior gameplay within the virtual space, and/or other information), attribute modification information, attribute modification information look-up information, and/or information.

In some implementations, attribute modification information may facilitate making changes from a currently defined set of attribute values of the game entities, and/or other changes. The set of attribute values may comprise one or more attribute values of one or more game entity attributes. By way of non-limiting example, attribute modification information may facilitate making changes from individual ones of the currently defined attributes values by individual discrete amounts. In some implementations, attribute modification information may facilitate defining a new set of attribute values independent from the currently defined set of attribute values.

In some implementations, attribute modification information may specify discrete amounts by which one or more currently defined attribute values of one or more game entity attributes may be changed. A discrete amount may be specified as one or more of an increase in a currently defined attribute value, a decrease in a currently defined value, a multiple of a currently defined attribute value, and/or other changes from one or more currently set attribute values.

By way of non-limiting example, a change may specify changing a currently defined attribute value of a first attribute of a game entity by a first amount. The currently defined attribute value may comprise a first attribute value. The change may cause the first attribute value to change by the first amount to a first modified attribute value. By way of non-limiting illustration, the first attribute may be an ability attribute associated with "punching" and/or other ability. The first amount may comprise, for example, "2 levels." The change may therefore specify that a game entity's punching power should increase from the first attribute value by "2 levels," and/or other amounts. If the first attribute values specifies "level 1" punching power, the first modified attribute value may specify "level 3" punching power.

By way of non-limiting illustration, a change may specify changing a currently defined attribute value of a second attribute of a game entity by a second amount. The second attribute may be an appearance attribute associated with a color of the game entity, and/or other appearance attribute. The second amount may comprise, for example, "5 shades brighter," and/or other amount. The change may therefore specify that a game entity's color appearance should increase from a currently set color value by "5 shades brighter," and/or other amounts.

In some implementations, a change may specify a new attribute value for a third attribute of a game entity independent from a currently defined attribute value. The third attribute may be an appearance attribute associated with an article of virtual clothing worn by the game entity, and/or other appearance attribute. The new attribute value may comprise, for example, "a pirate's hat," and/or other article of virtual clothing. The change may therefore specify that a game entity's appearance should now include a pirates hat being worn by the game entity in the virtual space (independent from what headwear the game entity may or may not have been wearing).

Attribute modification information look-up information may facilitate determining attribute modification information based on a look-up of the information within one or more storage locations that are different from an individual token. By way of non-limiting example, one or more of computing platform 102, one or more other computing platforms 103, server(s) 118, and/or other entities participating in system 100 may store attribute modification information. The attribute modification information look-up information may comprise one or more of a name, a serial number, an identifier, a network address, file location within an archive or on storage, and/or other look-up information that may facilitate determining attribute modification information from one or more storage locations. In some implementations, storing attribute modification information look-up information (as opposed to attribute modification information itself) may reduce the amount of information needed to be stored at a given token.

In some implementations, attribute modification information may include changes to attribute values of multiple ones of the game entity attributes (e.g., a set of attribute values). In some implementations, the set of attribute values of different ones of the game entity attributes may be related by a common theme. By way of non-limiting example, a theme may be associated with a game entity, a movie, a real-world location, a virtual location, a person, a group of people, a brand, a time period (e.g., "the 1920's," and/or other time period), and/or other themes.

By way of non-limiting example, a change specifying a new attribute value of an appearance attribute, a change from a currently defined value of an ability attribute, and/or other changes included in attribute modification information may be related by a common theme. The theme may be associated with an individual game entity and/or other themes. For illustration, the theme may be the fictitious character HULK, and/or other theme. The character is generally known for its green color and incredible strength. The new attribute value of the appearance attribute may be associated with making the game entity appear "green." The change from the currently set value of the ability attribute may be associated with increasing the game entity's punching power by some amount (e.g., 5 levels and/or other amount). Other changes specified in attribute modification information may be made in accordance with the theme (e.g., the game entity's size may be increased, and/or other changes).

The attribute component 114 may be configured to determine currently defined attribute values of one or more game entity attributes of one or more game entities associated with individual users. The attribute values may be determined as "current" with respect to when token detection may take place, attribute modification information may be obtained, and/or at other times. As presented herein, currently defined attribute values may include one or both of default attribute values and/or values defined based on gameplay.

In some implementations, attribute component 114 may be configured to determine currently defined attribute values by querying one or more of user component 108, space component 110, and/or other components of system 100. By way of non-limiting example, at a prior gameplay session in the virtual space, a user may have "up-graded" and/or other modified one or more attribute values of a given game entity, and/or may have one or more attribute values still defined by default values. The attribute values may have be stored within gameplay information associated with the user and/or game entity (e.g., within user component 108, electronic storage of a given token, and/or other component).

By way of non-limiting example, token reader 124 may be configured to provide signals conveying information associated with a token 126. The information associated with token 126 may include one or more of information that facilitates detection and/or identification of token 126, first attribute modification information, and/or other information. By way of non-limiting example, detection and/or identification of token 126 may be facilitated based on a first signal received from the token reader 124 that conveys information associated with token 126 and/or other information. A detection and/or identification of token 126 may facilitate effectuating a first game entity associated with token 126 within an instance of the virtual space. The first game entity may be instantiated based on gameplay information associated with the first game entity. For example, gameplay information may include currently defined attribute values of the game entity. Currently defined values may include one or both of default attribute values and/or values defined from prior gameplay within the virtual space by a user using the first game entity. Such values may be determined from one or more of the user component 108, space component 110, other components, token 126, and/or other storage locations.

The attribute component 114 may be configured to determine one or more of the currently defined attribute values.

The modification component 116 may be configured to obtain attribute modification information based on signals received from token readers. As presented herein, one or more signals received from a token reader (e.g., token reader 124) may convey one or more of attribute modification information, attribute modification information look-up information, and/or other information. In some implementations, modification component 116 may be configured to obtain attribute modification information based on determining the attribute modification information from signals received from token readers. In some implementations, modification component 116 may be configured to obtain attribute modification information based on one or more of determining attribute modification information look-up information from signals received from token readers, retrieving the attribute modification information from a storage location using the attribute modification information look-up information, and/or other operations.

By way of non-limiting example, modification component 116 may be configured to obtain first attribute modification information on a second signal received from token reader 124. The first attribute modification information may facilitate making changes from a set of currently attribute values of the first game entity. For the example, the first attribute modification information may be associated with a first modification and/or other modifications. The first modification may include a change from a currently defined first set of attribute values of game entity attributes of the first game entity. In some implementations, the second signal may be received from token reader 124 responsive to a token that is different from a token embodying the physical appearance of the first game entity being detectable by token reader 124. In some implementations, the information conveyed by the first signal and the second signal may instead be conveyed by a single signal received from token reader 124.

The modification component 116 may be configured to effectuate modifications from a currently defined set of attribute values of game entity attributes responsive to attribute modification information being obtained. In some implementations, modifications may be effectuated in real time as attribute modification information is obtained. In some implementations, modifications may be effectuated while one or both of a token embodying the physical appearance of a game entity (e.g., and facilitating presentation of the game entity within in instance of the virtual space), and another token configured to store attribute modification information (and/or attribute modification information look-up information) are concurrently detected by token reader 124. In some implementations, ongoing concurrent detection of the tokens may not be required to effectuate modifications.

By way of non-limiting illustration, modification component 116 may be configured to effectuate the first modification and/or other modifications. The first modification may include a change from the first set of attribute values to a second set of attribute values, and/or other changes.

The behavior component 117 may be configured to implement behavior trees that specify behaviors of game entities. Behavior trees may be stored in electronic storage 119 and/or other storage location. Behavior trees may include nodes that correspond to different states of the game entities and/or different states of actions or behavior of game entities. As used herein, the terms "node" and "state" and their derivatives may be used interchangeably when referring to behavior trees. Behavior trees may include edges that correspond to transitions between nodes. A complex action for a game entity may be implemented by a sequence of nodes within a behavior tree.

By way of non-limiting illustration, when a game entity performs a jump, such an action may be implemented by a sequence of nodes going from lift-off, via hang-time, to landing. A sequence may include one or more transitions between different nodes. A transition from a first node to a second node may be referred to as an edge. For complex game entities, multiple components may act (at least somewhat) independently. For example, the legs, torso, arms, head, and/or other components of a game entity may have a range of possible motions/actions during a particular action such as a jump. Arms could flail, hold a weapon, reload, cast a spell, and/or other actions. The head could tilt in different directions, have different expressions, and/or other actions. The landing may be standing up straight, crouching, rolling, and/or other actions. In some embodiments, a game entity may have multiple concurrently active nodes within a behavior tree such that individual nodes correspond to different components within the game entity. Within a sequence of nodes, some nodes may be more significant than other nodes. For example, the first node of a particular action, such as a jump, may contain all or much of the information needed to determine important aspects of the action, such as the expected location of a game entity after the jump is completed. As a result, intermediate nodes between the first node and the last node of a particular action may be less significant than the first node.

It is noted that the above description of a behavior tree specify a "jump" action in the virtual space is provided for illustrative purposes only and is not to be considered limiting. For example, one or more the techniques described above may be similarly implemented for other types of actions.

In some implementations, individual behavior trees specifying behaviors for individual actions may be associated with individual game entities and/or a group of game entities defined by a particular set of attribute values. By way of non-limiting example, one or more game entities defined by a first set of attribute values may be associated with a first behavior tree specifying behavior for carrying out a first action, while one or more game entities defined by a second set of attribute values may be associated with a second behavior tree specifying behavior for carrying out the same first action.

In some implementations, behavior component 117 may be configured to effectuate changes from individual behavior trees that are implemented for individual game entities to other individual behavior trees responsive to modifications to one or more attribute values of the individual game entities being effectuated. By way of non-limiting example, a first game entity may be defined at least in part by the first set of attribute values. The first game entity may be associated with the first behavior tree for carrying out a first action. Detection of one or more tokens and/or subsequent modification (e.g., a first modification) to attribute values of the first game entity may cause the first game entity to be defined at least in part by the second set of attribute values. The behavior component 117 may be configured such that the behavior of the first game entity for carrying out the first action may be specified based on implementation of the second behavior tree and not the first behavior tree responsive to the first modification being effectuated.

In some implementations, a requirement for a change to behavior tree implementation to be effectuated may include concurrent detection by token reader 124 of one or both of a token embodying the physical appearance of a game entity (e.g., facilitating presentation of the game entity within in instance of the virtual space) and/or another token configured to store attribute modification information (and/or attribute modification information look-up information). In some implementations, responsive to one or both of the token embodying the physical appearance of a game entity and/or the other token configured to store attribute modification information not being individually detected and/or concurrently detected, changes to behavior tree implementation may no longer be effectuated. By way of non-limiting example, a prior implemented behavior tree may be re-implemented responsive to one or both of the token embodying the physical appearance of a game entity and/or the other token configured to store attribute modification information being removed from detection by token reader 124. In some implementations, ongoing concurrent detection of the tokens may not be required to effectuate changes to behavior trees being implemented. In some implementations, changes to behavior trees may be implemented in accordance with one or more periods of time (e.g., one hour, one day, one week, and/or other periods of time). Expiration of a period of time may cause the specification of behavior tree to switch back to a prior behavior tree.

In some implementations, effectuating changes from one behavior tree to another may be based on one or more of active nodes of the prior behavior tree, correlations between nodes of the behavior trees, and/or other information. By way of non-limiting example, the subsequent behavior tree may be defined and implemented based on the active nodes of the prior behavior tree. By implementing subsequent behavior trees based on the active state of a preceding behavior tree, the behavior changes may be effectuated nearly instantaneously, or "on-the-fly." For example, a game entity may about to perform a first action, such as a jump. The game entity may achieve a first state to prepare to complete action, such as getting into a crouch position. The game entity may have achieved the first state and/or preparation to complete the action based on a first behavior tree. The game entity being in the first state may correspond to a set of active nodes of the first behavior tree. At that time, one or more attribute values may be modified (e.g., a token may have been detected). the modified attribute values may correspond to a second behavior tree for the first action. The set of active nodes of the first behavior tree may be correlated to a set of nodes of the second behavior tree. The second behavior tree may then be implemented with the correlated nodes being active. As such, the second behavior tree may be used to complete the rest of the behaviors and/or actions for the first action (e.g., from the crouch, to lift off, to hang time, to landing).

By way of non-limiting example, behavior component 117 may be configured such that specifying behavior of the first game entity based on implementation of the second behavior tree and not the first behavior tree may comprise one or more of: determining a first state of the first behavior tree prior to effectuating the first modification; defining the second behavior tree based on the first state; implementing the second behavior tree defined by the first state to specify behaviors of the first game entity; and/or other operations. In some implementations, determining the first state may comprise identifying active nodes of the first behavior tree prior to effectuating the first modification, and/or other operations. In some implementations, defining the second behavior tree may comprise correlating the active nodes of the first behavior tree with corresponding nodes of the second behavior tree, and/or other operations. In some implementations, implementing the second behavior tree defined by the first state may comprise implementing the second behavior tree with the corresponding nodes being activated, and/or other operations.

The behavior component 117 may be configured such that changes from individual behavior trees that are implemented for individual game entities to other individual behavior trees may be effectuated in real-time, or near real-time, as the modifications to one or more attribute values of the individual game entities may be effectuated.

Figure 2:
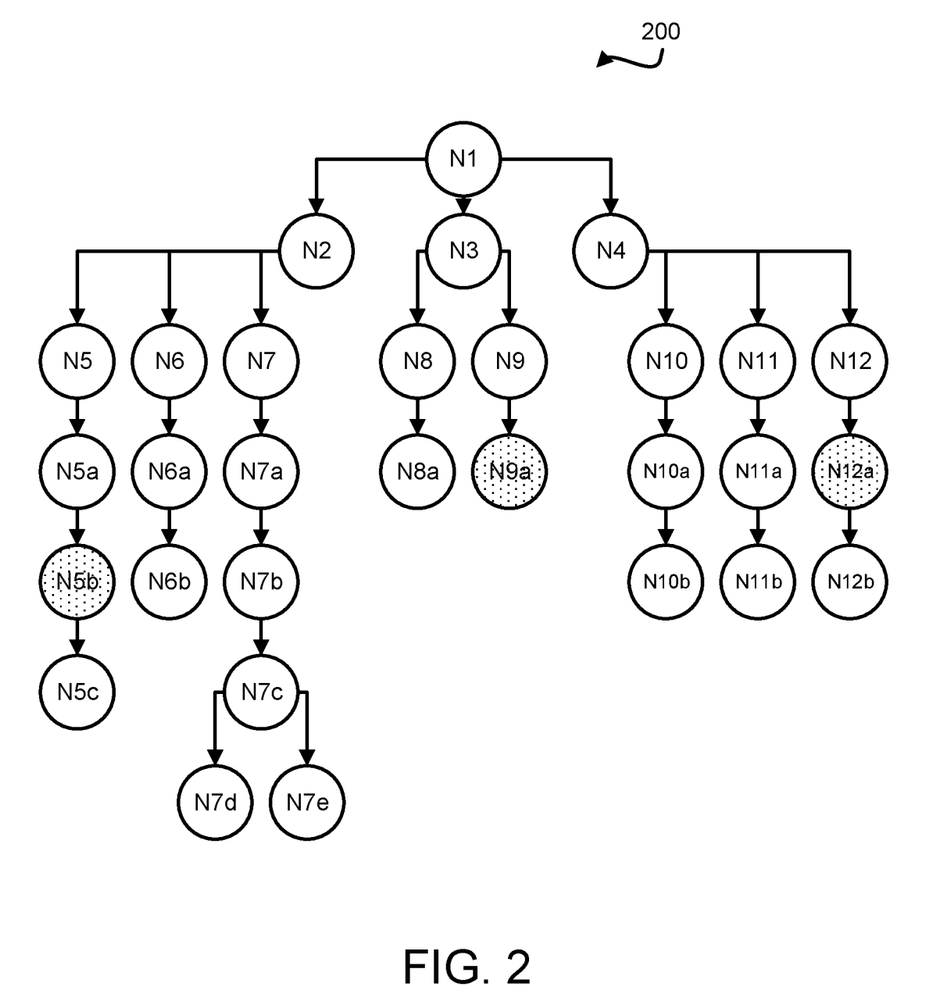
FIG. 2 illustrates an exemplary behavior tree associated with game entities defined at least in part by a first set of attribute values.

FIG. 2 illustrates a graphical representation of a first behavior tree 200 specifying behaviors for carrying out a first action. Behavior tree 200 may include nodes labeled "N" with a number or designation affixed to it. For illustrative purposes, first behavior tree 200 may be implemented for game entities that includes three components or parts, labeled N2, N3, and N4. The three components or parts may act (at least somewhat) independently. By way of non-limiting illustration, legs, arms, and head of a game entity may form independent parts of the game entity. First behavior tree 200 may be implemented for game entities defined at least in part by a first set of attribute values.

A section of behavior tree 200 that corresponds to individual components or parts may be referred to as sub-trees. As depicted, the behavior tree 200 may specify behaviors associated with the first action, labeled as "N1." Sub-tree N2 may include three different complex behaviors or sequences of nodes, labeled N5, N6, and N7. Sub-tree N2 may correspond to a first component or part, such as the head. Sub-tree N3 may include two different complex behaviors or sequences of nodes, labeled N8 and N9. Sub-tree N3 may correspond to a second component or part, such as the legs. Sub-tree N4 may include three different complex behaviors or sequences of nodes, labeled N10, N11, and N12. Sub-tree N4 may correspond to a third component or part, such as the arms.

As depicted in FIG. 2, individual actions or sequences of nodes, here labeled N5-N12, may include additional subsequent nodes. These nodes may be used to implement complex behaviors. For example, N6 may progress to node N6a and/or N6b.

FIG. 2 may not depict all possible or available transitions between nodes for simplicity. An action for the object may involve one or more of the sub-trees. For example, the first action may be a "jump." The legs, arms, and head of the game entity may perform different sequences within first behavior tree 200. Depending on interaction with the user and/or other virtual objects, a current state of first behavior tree 200 may be described as a set of currently active nodes, for example (N5b, N9a, N12a), (N7c, N8, N11b), and so forth. For illustration, the current state illustrates active nodes (N5b, N9a, N12a) by virtue of the dotted fill pattern within the respective nodes.

Particular progress within a behavior tree may be referred to as a traversal. In some implementations, traversal in a behavior tree may include probability. For example, the implementation of one of the sequences of nodes following N5, N6, and/or N7 for first component N2 of a game entity may be left to chance. By way of further non-limiting example, a next state after node N7c can be either N7d or N7e, and the determination may be left to chance. For example, an incoming projectile may or may not hit an object, and the chance of hitting may be, for example, 20%. The behavior (and/or node or traversal) after a hit may be different from the behavior, if any, after a miss. The determination of such probabilities (e.g. the result of the 20% chance) may be made for the game entity with which the behavior tree may be implemented. Behavior trees may allow many different traversals. Note that the number of nodes, sub-trees, sequences and other particulars of behavior tree 200 are merely exemplary and not intended to be limiting in any way.

Figure 3:
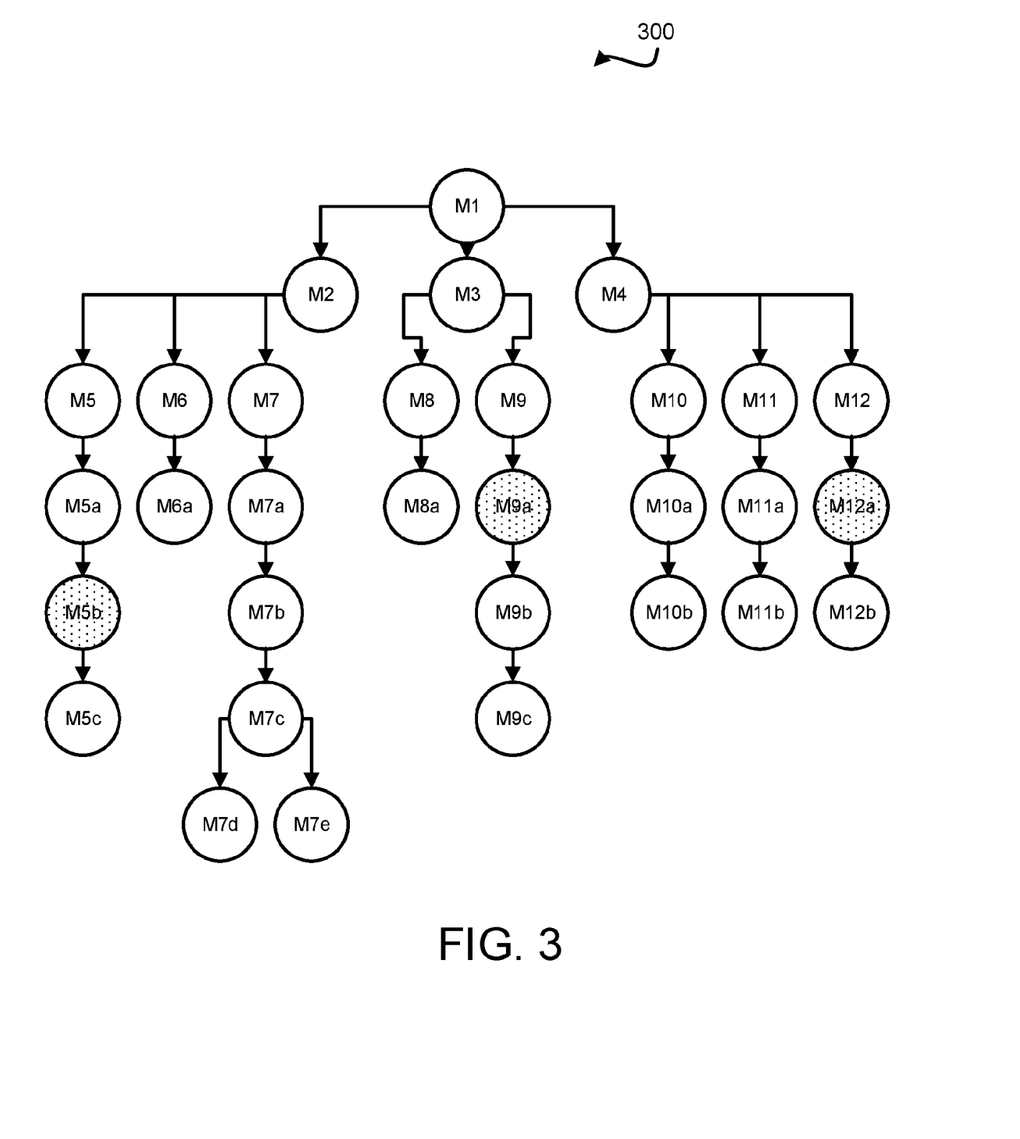
FIG. 3 illustrates an exemplary behavior tree associated with game entities defined at least in part by a second set of attribute values.

FIG. 3 illustrates a graphical representation of a second behavior tree 300 specifying behaviors for carrying out the first action. Behavior tree 200 may be implemented for game entities defined at least in part by a second set of attribute values. Second behavior tree 300 may include nodes labeled "M" with a number or designation affixed to it. For illustrative purposes, behavior tree 300 may be implemented for game entities that includes three components or parts, labeled M2, M3, and M4. Components labeled M2, M3, and M4 may be same or similar components of first behavior tree 200 in FIG. 2 (e.g, N2, N3, and N4, respectively).

A section of second behavior tree 300 that corresponds to individual components or parts may be referred to as sub-trees. As depicted, the behavior tree 200 may specify behaviors associated with the first action, labeled as "M1" within second behavior tree 300 for illustrative purpose. Sub-tree M2 may include three different complex actions or sequences of nodes, labeled M5, M6, and M7. Sub-tree M2 may correspond to sub-tree N2 of first behavior tree 200 (FIG. 2). However, the three different complex actions or sequences of nodes, labeled M5, M6, and M7, may comprise different complex behaviors (e.g., and possibly more or fewer nodes in the respective sequences) than the sequences of nodes, labeled N5, N6, and N7 in first behavior tree 200 (FIG. 2). Sub-tree M3 may include two different complex behaviors or sequences of nodes, labeled M8 and M9. Sub-tree M3 may correspond to sub-tree N3 of first behavior tree 200, however specifying different behaviors. Sub-tree M4 may include three different complex behaviors or sequences of nodes, labeled M10, M11, and M12. Sub-tree M4 may correspond to sub-tree N4 of first behavior tree 200, however specifying different behaviors.

In some implementations, effectuating a change from implementation of the first behavior tree 200 (FIG. 2) to the second behavior tree 300 (FIG. 3) for specifying behaviors of the first action may comprise one or more of: identifying active nodes of the first behavior tree 200; correlating the active nodes of the first behavior tree 200 with corresponding nodes of the second behavior tree 300; implementing the second behavior tree 300 with the corresponding nodes being activated; and/or other operations. By way of non-limiting illustration, the active nodes of first behavior tree 200 (N5b, N9a, N12a) may correspond to nodes (M5b, M9a, M12a) of second behavior tree. The nodes (M5b, M9a, M12a) in second behavior tree 300 may be activated and second behavior tree 300 may be implemented to carryout remaining behaviors of the first action.

In some implementations, sets of attribute values that may be associated with particular behavior trees may not necessarily include attribute values for a behavior attribute. By way of non-limiting example, different behavior trees may be implemented based on modification to attribute values of appearance attributes and/or other game entity attributes that may not include behavior attributes. However, it is noted that subsequent implementation of a new behavior tree may cause one or more values of behavior attributes to change.

In some implementations, individual behavior trees and individual sets of attribute values may be related by one or more themes. For example, a first game entity defined at least in part by a first set of attribute values may be associated with a first behavior tree specifying behaviors for a first action. The first set of attribute values and the behaviors specified by the first behavior tree for carrying out the first action may be related by a first theme. A second game entity defined at least in part by a second set of attribute values may be associated with a second behavior tree specifying behaviors for the first action. The second set of attribute values and the behaviors specified by the second behavior tree for carrying out the first action may be related by a second theme.

By way of non-limiting illustration, the first theme may be the fictional character the HULK. The first set of attribute values may specify one or more values of one or more appearance attributes such that the first game entity appears green and/or muscular. The first action may be "walking." The first behavior tree may specify a walking behavior that mimics that of the fictional character HULK. By way of non-limiting example, implementing the first behavior tree may cause the first game entity to walk in long strides while stomping their feet vigorously at each step.

In some implementations, a requirement for the change from an implementation of the first behavior tree 200 (FIG. 2) to the second behavior tree 300 (FIG. 3) to maintain in effect may include concurrent detection by token reader of one or both of a token embodying the physical appearance of a game entity (e.g., facilitating presentation of the game entity within in instance of the virtual space) and/or another token configured to store attribute modification information (and/or attribute modification information look-up information). By way of non-limiting illustration, responsive to one or both of the token embodying the physical appearance of a game entity and/or the other token configured to store attribute modification information being removed from a token reader, specification of behavior of the game entity may change back to the first behavior tree 200 (FIG. 2) and not the second behavior tree 300 (FIG. 3). Changing back to implementation of the first behavior tree 200 may comprise one or more of: identifying active nodes of the second behavior tree 300 at a time point in time there is no longer individual and/or concurrent detection; correlating the active nodes of the second behavior tree 300 with corresponding nodes of the first behavior tree 200; implementing the first behavior tree 200 with the corresponding nodes being activated; and/or other operations.

Returning to FIG. 1, the computing platform 102, one or more other computing platforms 103, one or more servers 118, and/or external resources 122 may be operatively linked via one or more electronic communication links. For example, such electronic communication links may be established, at least in part, via one or more networks 120, such as the Internet and/or other networks. It will be appreciated that this is not intended to be limiting and that the scope of this disclosure includes implementations in which the computing platform 102, one or more other computing platforms 103, one or more servers 118, and/or external resources 122 may be operatively linked via some other communication media.

The external resources 122 may include sources of information, hosts, and/or providers of virtual spaces outside of system 100, external entities participating with system 100, external entities for player-to-player communications, and/or other resources. In some implementations, some or all of the functionality attributed herein to external resources 122 may be provided by resources included in system 100.

The computing platform 102 may include electronic storage 119, one or more processors 104, and/or other components. The computing platform 102 may include communication lines or ports to enable the exchange of information with a network and/or other computing platforms. Illustration of computing platform 102 in FIG. 1 is not intended to be limiting. The computing platform 102 may include a plurality of hardware, software, and/or firmware components operating together to provide the functionality attributed herein to computing platform 102.

Electronic storage 119 may comprise electronic storage media that electronically stores information. The electronic storage media of electronic storage 119 may include one or both of system storage that is provided integrally (i.e., substantially non-removable) with computing platform 102 and/or removable storage that is removably connectable to computing platform 102 via, for example, a port or a drive. A port may include a USB port, a firewire port, and/or other port. A drive may include a disk drive and/or other drive. Electronic storage 119 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 119 may include one or more virtual storage resources (e.g., cloud storage, a virtual private network, and/or other virtual storage resources). Electronic storage 119 may store software algorithms, information determined by processor(s) 104, information received from server(s) 118, information received from one or more other computing platforms 103, and/or other information that enables computing platform 102 to function as described herein.

Processor(s) 104 is configured to provide information-processing capabilities in computing platform 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, 112, 114, 116, and/or 117. Processor(s) 104 may be configured to execute components 108, 110, 112, 114, 116, and/or 117 by software; hardware; firmware; some combination of software, hardware, and/or firmware; and/or other mechanisms for configuring processing capabilities on processor(s) 104.

It should be appreciated that although components 108, 110, 112, 114, 116, and/or 117 are illustrated in FIG. 1 as being co-located within a single processing unit, in implementations in which processor(s) 104 includes multiple processing units, one or more of components 108, 110, 112, 114, 116, and/or 117 may be located remotely from the other components. The description of the functionality provided by the different components 108, 110, 112, 114, 116, and/or 117 described above is for illustrative purposes and is not intended to be limiting, as any of components 1108, 110, 112, 114, 116, and/or 117 may provide more or less functionality than is described. For example, one or more of components 108, 110, 112, 114, 116, and/or 117 may be eliminated, and some or all of its functionality may be provided by other ones of components 108, 110, 112, 114, 116, 117, and/or other components. As another example, processor(s) 104 may be configured to execute one or more additional components that may perform some or all of the functionality attributed below to one of components 108, 110, 112, 114, 116, and/or 117.

Figure 4:
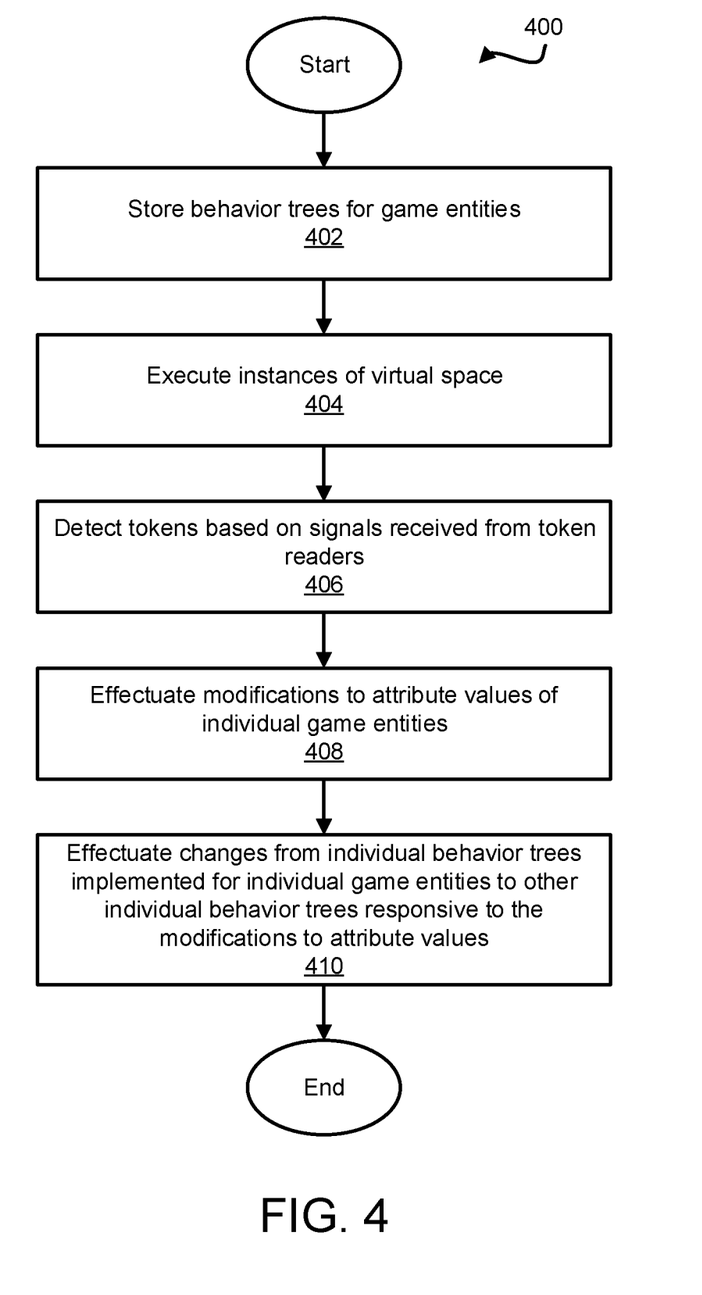
FIG. 4 illustrates a method of implementing behavior trees when modifying attribute values of game entities based on physical token detection, in accordance with one or more implementations.

FIG. 4 illustrates a method 400 of implementing behavior trees when modifying attribute values of game entities based on physical token detection. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in a computer system comprising one or more of one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 400 in response to instructions stored electronically on electronic storage medium. The one or more processing devices may include one or more devices configured through hardware, firmware, and/or software to be specifically designed for execution of one or more of the operations of method 400.

At an operation 402, behavior trees for game entities may be stored. Individual game entities may be defined by sets of attribute values of game entity attributes. Individual behavior trees may specify behaviors of individual game entities within the virtual space for carrying out actions within the virtual space. The behavior trees may include one or more of a first behavior tree that is implemented for game entities defined by a first set of attribute values, a second behavior tree that is implemented for game entities defined by a second set of attribute values, and/or other behavior trees. In some implementations, operation 402 may be performed by one or more physical processors executing a behavior component the same as or similar to behavior component 117 (shown in FIG. 1 and described herein).

At an operation 404, instances of a virtual space may be executing and implemented to facilitate participation by users in the virtual space via computing platforms associated with the users. User participation may include controlling game entities associated with the users within the virtual space and/or other participation. By way of non-limiting illustration, a first instance of the virtual space may be executed and implemented to facilitate participation by a first user via a first computing platform. Participation by the first user may include controlling a first game entity within the first instance of the virtual space. The first game entity may be defined at least in part by the first set of attribute values such that a behavior of the first game entity is specified based on implementation of the first behavior tree. In some implementations, operation 404 may be performed by one or more physical processors executing a space component the same as or similar to space component 110 (shown in FIG. 1 and described herein).

At an operation 406, tokens may be detected based on signals received from token readers. By way of non-limiting example, a first token reader may be communicatively coupled with the first computing platform. Individual tokens may be standalone physical objects. The tokens may include a first token and/or other tokens. The first token may be detectable based on a first signal conveying information associated with the first token being received from the first token reader. In some implementations, operation 406 may be performed by one or more physical processors executing a token detection component the same as or similar to the token detection component 112 (shown in FIG. 1 and described herein).

At an operation 408, modifications to attribute values of individual game entities may be effectuated responsive to individual tokens being detected. The modifications may include a first modification to attribute values of the first game entity configured to be effectuated responsive to the first token being detected, and/or other modifications. The first modification may include a change from the first set of attribute values to the second set of attributes values, and/or other changes. In some implementations, operation 408 may be performed by one or more physical processors executing a modification component the same as or similar to the modification component 116 (shown in FIG. 1 and described herein).

At an operation 410, changes from individual behavior trees that are implemented for individual game entities to other individual behavior trees may be effectuated responsive to the modifications to attribute values being effectuated. By way of non-limiting example, the behavior of the first game entity may be specified based on implementation of the second behavior tree and not the first behavior tree responsive to effectuating the first modification. In some implementations, operation 410 may be performed by one or more physical processors executing a behavior component the same as or similar to the behavior component 117 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to implement behavior trees when modifying attribute values of game entities based on physical token detection, the system comprising:
one or more physical processors configured by machine-readable instructions to:
store behavior trees for game entities in a virtual space, individual game entities being defined by sets of attribute values of game entity attributes, wherein individual behavior trees specify behaviors of individual game entities within the virtual space for carrying out individual actions within the virtual space, the individual behavior trees including sub-trees and sets of sequences of nodes nested under individual sub-trees, the individual sub trees corresponding to individual components of the individual game entities, individual nodes corresponding to individual states of the behaviors of the individual components of the individual game entities while carrying out the individual actions, such that progress in carrying out the individual actions is based on traversal through the individual nodes in an individual set of sequences of nodes for the individual sub-trees, the behavior trees including a first behavior tree that is implemented for game entities defined by a first set of attribute values, and a second behavior tree that is implemented for game entities defined by a second set of attribute values;
execute instances of a virtual space and implement the instances of the virtual space to facilitate participation by users in the virtual space via computing platforms associated with the users, user participation including controlling game entities associated with the users within the virtual space, such that a first user participates in a first instance of the virtual space via a first computing platform, participation by the first user including controlling a first game entity within the first instance of the virtual space, wherein the first game entity is defined at least in part by the first set of attribute values such that a behavior of the first game entity is specified based on implementation of the first behavior tree;
detect physical tokens based on signals received from token readers, a first token reader being communicatively coupled with the first computing platform, individual physical tokens being standalone physical objects, the physical tokens including a first token, the first token being detectable based on a first signal conveying information associated with the first token being received from the first token reader;
effectuate modifications to attribute values of individual game entities responsive to individual physical tokens being detected, the modifications including a first modification to attribute values of the first game entity configured to be effectuated responsive to the first token being detected, the first modification including a change from the first set of attribute values to the second set of attributes values; and
effectuate changes from individual behavior trees that are implemented for individual game entities to other individual behavior trees responsive to the modifications to attribute values of the individual game entities being effectuated, such that the behavior of the first game entity is specified based on implementation of the second behavior tree and not the first behavior tree responsive to effectuating the first modification.

2. The system of claim 1, wherein the changes from individual behavior trees that are implemented for individual game entities to other individual behavior trees are effectuated in real-time, or near real-time, as the modifications to attribute values of the individual game entities are being effectuated.

3. The system of claim 1, wherein specifying behavior of the first entity based on implementation of the second behavior tree and not the first behavior tree comprises:
determining a first state of the first behavior tree prior to effectuating the first modification;
defining the second behavior tree based on the first state; and
implementing the second behavior tree defined by the first state to specify behaviors of the first game entity.

4. The system of claim 3, wherein specifying behavior of the first entity based on implementation of the second behavior tree and not the first behavior tree further comprises:
identifying active nodes of the first behavior tree prior to effectuating the first modification;
correlating the active nodes of the first behavior tree with corresponding nodes of the second behavior tree; and
implementing the second behavior tree with the corresponding nodes being activated.

5. The system of claim 1, wherein the first set of attribute values and the first behavior tree are related to a first theme, and wherein the second set of attribute values and the second behavior tree are related to a second theme.

6. The system of claim 1, wherein game entity attributes include one or more of an appearance attribute, an ability attribute, a behavior attribute, or an inventory attribute.

7. The system of claim 6, wherein first set of attribute values and second set of attribute values do not include attribute values of one or more of the appearance attribute, the ability attribute, or the inventory attribute.

8. The system of claim 1, wherein the first set of attribute values includes at least one attribute value of at least one game entity attribute, and wherein second set attribute values individually includes at least one attribute value of at least one game entity attribute.

9. The system of claim 1, wherein one or both of the first modification or the implementation of the second behavior tree are only effectuated while the first token is detected by the first token reader.

10. The system of claim 1, wherein the first behavior tree and second behavior tree are associated with a first action performed within the virtual space.

11. The system of claim 1, wherein the physical tokens include the first token and a second token, wherein the second token physically embodies an appearance of the first game entity, and wherein the first token has a physical appearance different from the second token.

12. A method to implement behavior trees when modifying attribute values of game entities based on physical token detection, the method being implemented in a computer system comprising one or more physical processors and storage media storing machine-readable instructions, the method comprising:

storing behavior trees for game entities in a virtual space, individual game entities being defined by sets of attribute values of game entity attributes, wherein individual behavior trees specify behaviors of individual game entities within the virtual space for carrying out individual actions within the virtual space, the individual behavior trees including sub-trees and sets of sequences of nodes nested under individual sub-trees, the individual sub trees corresponding to individual components of the individual game entities, individual nodes corresponding to individual states of the behaviors of the individual components of the individual game entities while carrying out the individual actions, such that progress in carrying out the individual actions is based on traversal through the individual nodes in an individual set of sequences of nodes for the individual sub-trees, the behavior trees including a first behavior tree that is implemented for game entities defined by a first set of attribute values, and a second behavior tree that is implemented for game entities defined by a second set of attribute values;

executing instances of a virtual space and implementing the instances of the virtual space to facilitate participation by users in the virtual space via computing platforms associated with the users, user participation including controlling game entities associated with the users within the virtual space, including executing a first instance of the virtual space and implementing the first instance to facilitate participation by a first user via a first computing platform, participation by the first user including controlling a first game entity within the first instance of the virtual space, wherein the first game entity is defined at least in part by the first set of attribute values such that a behavior of the first game entity is specified based on implementation of the first behavior tree;

detecting physical tokens based on signals received from token readers, a first token reader being communicatively coupled with the first computing platform, individual physical tokens being standalone physical objects, the physical tokens including a first token, the first token being detectable based on a first signal conveying information associated with the first token being received from the first token reader;

effectuating modifications to attribute values of individual game entities responsive to individual tokens being detected, the modifications including a first modification to attribute values of the first game entity configured to be effectuated responsive to the first token being detected, the first modification including a change from the first set of attribute values to the second set of attributes values; and effectuating changes from individual behavior trees that are implemented for individual game entities to other individual behavior trees responsive to the modifications to attribute values being effectuated, such that the behavior of the first game entity is specified based on implementation of the second behavior tree and not the first behavior tree responsive to effectuating the first modification.

13. The method of claim 12, wherein the changes from individual behavior trees that are implemented for individual game entities to other individual behavior trees are effectuated in real-time, or near real-time, as the modifications to attribute values of the individual game entities are being effectuated.

14. The method of claim 12, wherein specifying behavior of the first entity based on implementation of the second behavior tree and not the first behavior tree comprises:

determining a first state of the first behavior tree prior to effectuating the first modification;

defining the second behavior tree based on the first state; and implementing the second behavior tree defined by the first state to specify behaviors of the first game entity.

15. The method of claim 14, wherein specifying behavior of the first entity based on implementation of the second behavior tree and not the first behavior tree further comprises:

identifying active nodes of the first behavior tree prior to effectuating the first modification;

correlating the active nodes of the first behavior tree with corresponding nodes of the second behavior tree; and implementing the second behavior tree with the corresponding nodes being activated.

16. The method of claim 12, wherein the first set of attribute values and the first behavior tree are related to a first theme, and wherein the second set of attribute values and the second behavior tree are related to a second theme.

17. The method of claim 12, wherein game entity attributes include one or more of an appearance attribute, an ability attribute, a behavior attribute, or an inventory attribute.

18. The method of claim 17, wherein first set of attribute values and second set of attribute values include attribute values of one or more of the appearance attribute, the ability attribute, or the inventory attribute.

19. The method of claim 12, wherein the first set of attribute values includes at least one attribute value of at least one game entity attribute, and wherein second set attribute values individually includes at least one attribute value of at least one game entity attribute.

20. The method of claim 12, wherein one or both of the first modification or the implementation of the second behavior tree are only effectuated while the first token is detected by the first token reader.

21. The method of claim 12, wherein the first behavior tree and second behavior tree are associated with a first action performed within the virtual space.

22. The method of claim 12, wherein the physical tokens include the first token and a second token, wherein the second token physically embodies an appearance of the first game entity, and wherein the first token has a physical appearance different from the second token.

* * * * *